United States Patent Office 3,405,807
Patented Oct. 15, 1968

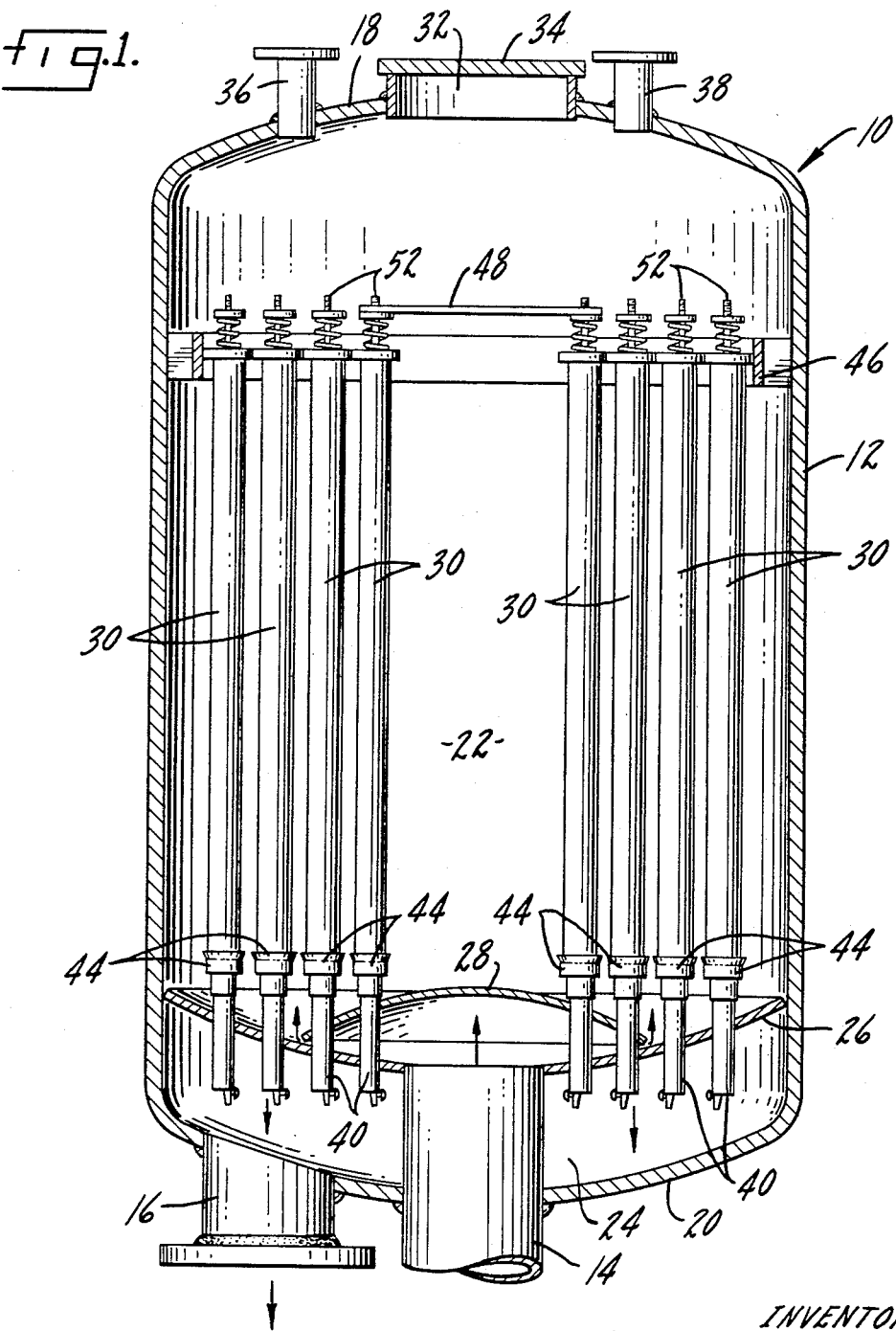

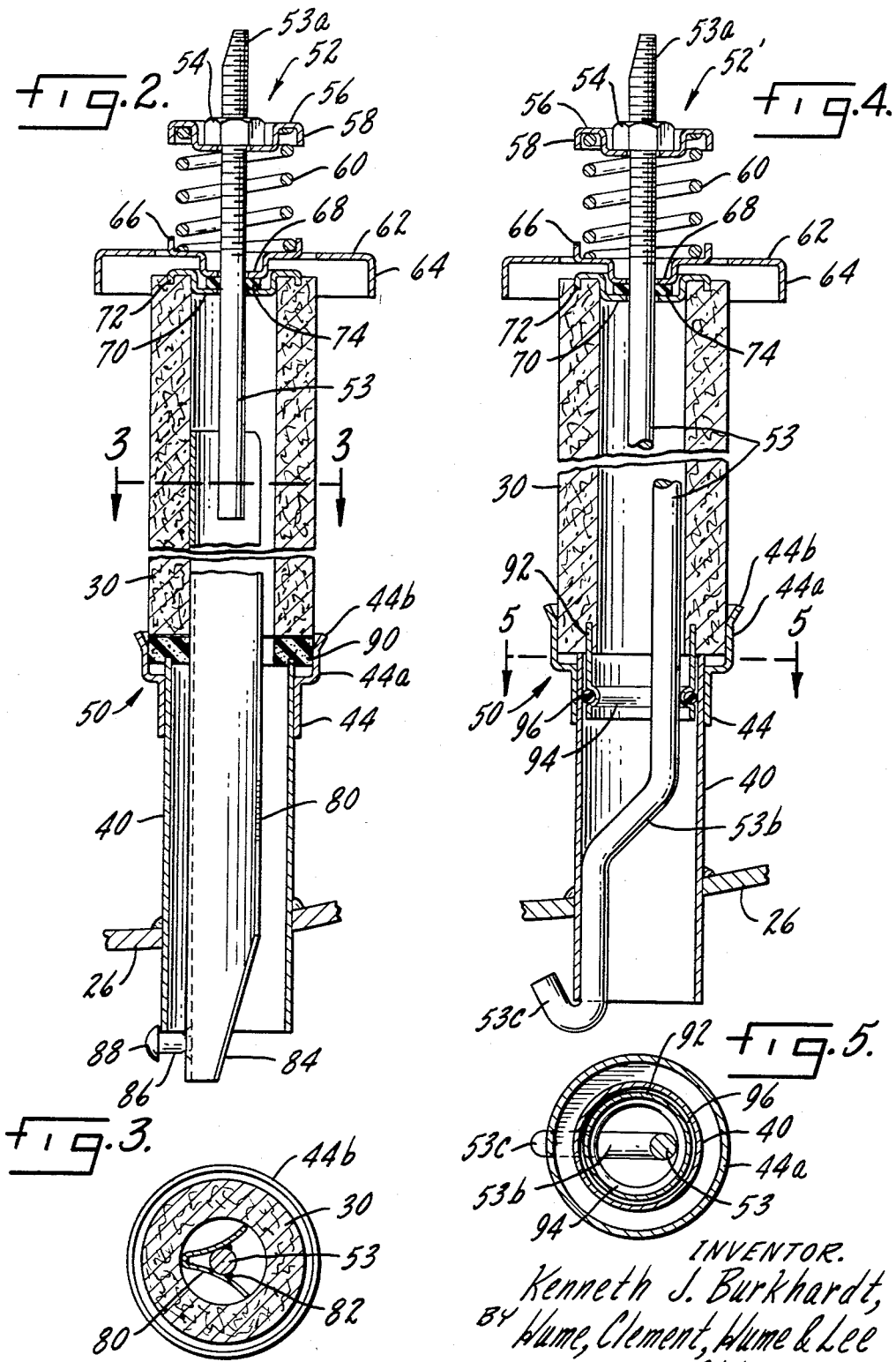

3,405,807
FILTER CARTRIDGE SEALING MEANS
Kenneth J. Burkhardt, Basking Ridge, N.J., assignor to Union Tank Car Company, Chicago, Ill., a corporation of New Jersey
Filed June 8, 1967, Ser. No. 644,710
11 Claims. (Cl. 210—232)

ABSTRACT OF THE DISCLOSURE

Improved apparatus for holding an annular filter cartridge in a filter tank. The cartridge is supported by a tubular seat means which is mounted in a partition in the tank. A fastening means extends through the cartridge and has a spring-loaded cartridge-gripping means at one end and a seat-engaging stop means at the other end. A sealing means is provided to seal the junction between the cartridge and the seat means. The sealing means may include an elastomeric gasket interposed between the cartridge and the seat means, or a cylindrical sleeve positioned within the seat means and partially embedded in the filter cartridge. The sealing means may also include a tubular shield embracing the junction between the cartridge and seat means.

Background, summary, drawings

This invention relates to filtration apparatus and, more particularly, to an improved means for holding an annular filter cartridge within a filter tank.

In one type of filter tank designed for use with annular filter cartridges, the tank is partitioned into influent and effluent zones by an internal plate means. The filter cartridges are supported in the influent zone of the tank by tubular seat means which are mounted in the plate means and which also serve to provide a fluid path from the influent zone to the effluent zone. The filter cartridges are maintained in place on the seat means by suitable fastening means, a very effective and novel form of which is disclosed and claimed in U.S. Patent No. 3,279,608, issued on Oct. 18, 1966, and assigned to the assignee of the present application.

In such filtration systems, the fluid to be filtered enters the influent zone of the tank and passes through the filter cartridges whereby impurities are removed. The fluid then passes through the interior of the filter cartridges, and through the seat means to the effluent zone, where it is discharged from the tank. Since it is important that all fluid pass through the filter cartridges before reaching the effluent zone, the junction between the seat means and the filter cartridges must be maintained fluid tight in order to prevent leakage of unfiltered fluid into the seat means. In prior filtration systems of the type described above, the filter cartridge simply rests upon the tubular seat means, with no additional sealing means being provided. Although such an arrangement may be satisfactory for certain applications, it is often desirable to provide means for establishing a more positive seal between the filter cartridge and the seat means.

Accordingly, a principal feature of the improved filter cartridge holding means, which is the subject of the present invention, is the provision of improved sealing means between the filter cartridge and the seat means. In one form of the invention, the sealing means includes a resilient gasket which is interposed between the filter cartridge and the seat means. In another form of the invention, the sealing means includes a cylindrical sleeve which is partially positioned within the seat means and which is partially embedded in the filter cartridge. In both forms of the invention, a tubular shield may be provided to embrace the junction between the filter cartridge and the seat means in close confinement.

The present invention provides an improved filter cartridge holding means which is adapted to establish a positive fluid seal between the filter cartridge and the seat means. A holding means in accordance with the present invention may be simply and inexpensively constructed, and the provision of a positive seal between the filter cartridge and the seat means in no way impairs the ready access to and removability of the filter cartridges from the filter tank.

The invention will be more fully understood from a consideration of the following detailed description, with illustrative reference to the drawings, in which:

FIGURE 1 is a side sectional elevation of filtration apparatus embodying the present invention;

FIGURE 2 is a side sectional elevation of a form of filter cartridge holding means constructed in accordance with the invention;

FIGURE 3 is a sectional view taken on the line 3—3 in FIGURE 2;

FIGURE 4 is a view similar to that of FIGURE 2, showing an alternative form of cartridge holding means; and FIGURE 5 is a sectional view taken on the line 5—5 in FIGURE 4.

Description of exemplary embodiment

With reference to FIGURE 1, filtration apparatus embodying the features of the present invention is indicated generally by the reference numeral 10. The filtration apparatus 10 comprises a filter tank 12 having an inlet conduit 14 and an outlet conduit 16. The filter tank 12 is a generally cylindrical vessel made of steel, or the like having outwardly convex top and bottom end portions 18 and 20, respectively. The tank 12 is partitioned into an influent zone 22 and an effluent zone 24 by a downwardly convex tube sheet plate 26 suitably secured to the interior of the tank by welding or the like.

The inlet conduit 14 enters the tank 12 through the bottom end 20 and passes upwardly through the effluent zone 24 and the tube sheet plate 26 to communicate with the influent zone 22. The conduit 14 is attached to the tube sheet plate 26 by welding or the like, so as to preclude fluid leakage from the influent zone 22 to the effluent zone 24. Fluid entering the influent zone 22 through the inlet conduit 14 is distributed radially outwardly by a distribution plate 28 which is mounted within the tank 12 by suitable means (not shown).

Mounted within the influent zone 22 are a plurality of filter cartridges 30 through which influent fluid must pass before entering the effluent zone 24 and being discharged from the tank 12 through the outlet conduit 16. The filter cartridges 30 are annular in shape, and are preferably wound from nylon or other suitable natural or synthetic fibers, in familiar fashion. Each of the filter cartridges 30 is supported within the influent zone 22 by a seat means 40. The seat means 40 are tubular in shape and also serve to provide a fluid path from the influent zone 22 to the effluent zone 24. The seat means 40 extend through the tube sheet plate 26 and are attached thereto by welding or other suitable means. Embracing the junctions between the filter cartridges 30 and the seat means 40 are tubular shields 44, which will be described in greater detail below.

The filter cartridges 3 are held in place on the seat means 40 by fastening assemblies 52, and the array of filter cartridges is maintained in lateral alignment by an annular member 46 attached to the interior of the tank 12, and by retaining members 48. Particularly appropriate structures for the retaining members 48 and for various forms of the fastening means 52 are disclosed in U.S. Patent No. 3,279,608, issued Oct. 18, 1966. As described therein, the filter cartridges 30 are placed into and removed from the filter tank 12 through a small manhole opening 32 which is defined in the top end 18 of the tank. The manhole opening 32 has a cover 34 which may be removed or opened to provide access to the interior of the filter tank 12.

The filter tank 12 is also provided with a pair of vents 36 and 38, either of which may be utilized as a spare inlet conduit. The vents 36 and 38 may be of any suitable construction, the selection of appropriate vent means being generally dependent upon the use of the filtration apparatus 10 and being within the ordinary skill of one in the art.

Referring now to FIGURES 2 and 3, there is shown a form of improved filter cartridge holding means 50 which embodies the features of the present invention. The holding means 50 includes, in addition to the seat means 40 and the tubular shield 44, a fastening assembly 52, and a gasket 90. The fastening assembly 52 comprises a rod portion 53, a spring cap 56, a spring 60, a spacer member 62, sealing means 74, a clamping member 70, a V-shaped element 80 and stop means 86.

The rod 53 extends part way into the interior of the filter cartridge 30 and is attached to the V-shaped member 80 by welding (as at 82) or other suitable means. The V-shaped member 80 terminates in a tapered portion 84 to which is attached the stop means 86. In this instance the stop means 86 consists of a rivet having a head 88. The head 88 of the rivet 86 projects over the end of the seat means 40 and provides a stop against upward force exerted by the spring 60.

The spring cap 56, which has a central aperture, is maintained in position on the rod 53 by a nut 54 attached to a threaded portion 53a of the rod 53. The spring 60 is confined between an annular flange 58 on the spring cap 56 and corresponding tabs 66 on the spacer member 62. The spacer member 62 has a downwardly extending annular hub portion 68 which is apertured to receive the rod 53 and which is separated from the clamping member 70 by the sealing means 74. The sealing means 74 is an elastomeric gasket, O-ring or the like, and serves to prevent fluid from passing into the upper opening of the filter cartridge 30 without first passing through the filter cartridge itself.

A downwardly extending annular flange 64 on the spacer member 62 serves to maintain adjacent filter cartridges 30 in spaced relationship. The clamping member 70 is adapted to grip one end of the filter cartridge 30 and comprises an annular plate made of steel or the like having a central aperture so that it may be placed on the rod 53. A downwardly extending annular flange 72 on the clamping member 70 engages and grips the end of the filter cartridge 30. In this manner, the clamping member 70 holds one end of the filter cartridge 30 and, through the force exerted by the spring 60, prevents the filter cartridge from lifting off the seat means 40.

The gasket 90 provides a fluid seal between the filter cartridge 30 and the seat means 40. The gasket 90 is preferably of the same cross-sectional configuration and dimension as the filter cartridge 30 and is formed from a resilient material, preferably an elastomer, having a hardness of from about 50 to about 90 Durometer on the Shore "A" scale. Suitable materials from which the gasket 90 may be formed include natural rubber; synthetic rubbers, e.g., styrene-butadient, butyl, nitrile, polysulfide, Buna-N, neoprene, silicone and acrylic; various fluoroelastomers, e.g., Viton, Fluorel 2141 and Kel-F; chloro sulfonated polyethylene; tetrafluoroethylene, including solid Teflon and filled and composite Teflon compositions; vinyl plastics; polyethylene; impregnated felts, e.g., Teflon-, rubber-, paraffin- or petrolatum-impregnated; and various plant fiber compositions, e.g., neoprene-impregnated wood fiber and nitrile ruber with cellulose fiber. Of course, the selection of an appropriate material from the foregoing list for the gasket 90 will be dictated by the above hardness requirement and will further depend upon expected service conditions such as temperature, the properties of the fluid which is to be filtered, mechanical stress, etc.

The gasket 90 may be cemented or otherwise attached by suitable means to the end of the filter cartridge 30. It will be noted that the end of the seat means 40 "bites" into the gasket 90 slightly, thus enhancing the fluid seal.

Attached to the end of the sead means 40 is the tubular shield 44, which may be made of steel or the like. The lower portion of the shield 44 is adapted to tightly embrace the seat means 40, and may be attached thereto by welding or other suitable means, or may simply be slightly tapered to provide a force fit. An enlarged portion 44a of the shield 44 is adapted to embrace a major portion of the gasket 90. The enlarged portion 44a terminates in an outwardly flaring flange 44b, which serves as a guide for positioning of the filter cartridge 30 on the seat means 40. Thus the shield 44 serves a dual purpose, inasmuch as it assists in maintaining the seal between the seat means 40 and the filter cartridge 30, and also assists in positioning of the cartridge on the seat means. In addition, the elastomeric gasket 90 tends to expand under service conditions, thus pressing more tightly against the shield 44 and further enhancing the fluid seal between filter cartridge 30 and the seat means 40.

To install a filter cartridge 30 within the tank 12, the cartridge is placed over the rod 53 and the V-shaped member 80, and the clamping member 70, the sealing means 74, the spacing member 62, the spring 60 and the spring cap 56 are placed over the rod 53, in that order. The nut 54 is then threaded onto the threaded end portion 53a to complete the fastening assembly 52. The cartridge assembly, which comprises the fasening assembly 52, the filter cartridge 30 and the gasket 90, is then inserted into the tank 12 through the manhole opening 32. The tapered end portion 84 of the V-shaped member 80 is inserted into the seat means 40, and the end of the filter cartridge 30 which bears the gasket 90 is guieded into position on the end of the seat means 40 by the flaring flange 44b of the shield 44. The spring 60 is then compressed until the tapered end portion 84 of the V-shaped element 80 emerges from the bottom of the seat means 40, at which point the pressure on the spring is released so that the head 88 of the rivet 86 engages the bottom of the seat means. The force exerted by the spring 60 causes the gasket 90 to fit firmly against the seat means 40 and thus holds the filter element 30 and the associated components of the fastening means 52 firmly in place. To remove filter cartridges 30 from the tank 12, the foregoing procedure is simply reversed.

Turning now to FIGURES 4 and 5, there is illustrated a modified form of cartridge holding means 50' which embodies the features of the present invention. Like reference numerals are employed in FIGURES 4 and 5 where the elements are the same as those in the holding means 50 discussed above with reference to FIGURES 2 and 3. The holding means 50' includes a modified fastening assembly 52' which differs from the fastening assembly 52 in that the rod 53 extends entirely through the filter cartridge 30 and the seat means 40. The rod 53 includes an offset portion 53b which terminates in a hook 53c. The hook 53c performs the same function as the rivet 86 which is attached to the V-shaped member 80 in the fastening assembly 52; i.e., the hook 53c serves as a stop means for resisting the upward force of the spring 60.

It will be noted that in the modified holding means 50', the filter cartridge 30 rests directly upon the end of the seat means 40. To seal the junction between the filter cartridge 30 and the seat means 40 there is provided a cylindrical sleeve 92 having a groove 94 to receive an O-ring 96. The sleeve 92 is positioned within the interior of the seat means 40, and the O-ring 96, which is preferably formed of an elastomeric material, presses firmly against the inner surface of the seat means 40, thus establishing a fluid seal. The upper portion of the sleeve 92 extends past the end of the seat means 40 and is actually inserted or embedded in the lower end of the filter cartridge 30. In this manner, fluid entering the seat means 40 must first have passed through the filter cartridge 30 itself. Again, the shield 44 provides the dual functions of enhancing the fluid seal between filter cartridge 30 and the seat means 40, and assisting in the positioning of the filter cartridge during installation.

Installation of filter cartridges 30 in association with the modified holding means 50′ is accomplished by the same method as that described above in connection with the holding means 50. Typically, the sleeve 92 will be embedded in the end of the filter cartridge 30 prior to installation.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

I claim:

1. In a filter tank having internal plate means for dividing said tank into first and second zones, holding means for holding an annular filter cartridge in said first zone, said holding means comprising: a tubular cartridge seat means mounted in said plate means and extending therethrough so that a first end of said seat means terminates in said first zone and a second end of said seat means communicates with said second zone, said first end of said seat means being adapted to support a first end of said filter cartridge; an annular resilient gasket interposed between said first end of said filter cartridge and said first end of said seat means; a tubular shield adapted to embrace at least a portion of said gasket and at least a portion of sid seat means in close surrounding confinement; and fastening means for urging said first end of said filter cartridge axially toward said first end of said seat means, said gasket formed of a material of sufficient resiliency to permit said first end of said seat means to partially embed itself in said gasket to force said gasket into contact with said shield.

2. The holding means of claim 1 wherein said fastening means extends through said filter cartridge and includes stop means for hooking onto said second end of said seat means and spring biased gripping means for gripping said second end of said filter cartridge.

3. The holding means of claim 1 wherein said gasket is formed of an elastomeric material having a hardness rating of from about 50 to about 90 Durometer as measured on the Shore "A" scale.

4. The holding means of claim 3 wherein said fastening means has a V-shaped member extending through said filter cartridge, and wherein said stop means is a rivet attached to said V-shaped member.

5. The holding means of claim 3 wherein said elastomeric material is selected from the group consisting of natural rubber; butyl, nitrile, styrene-butadiene, polysulfide, Buna-N, neoprene, silicone and acrylic synthetic rubbers; fluoroelastomers; polyethylene and chlorosulfonated polyethylene; tetrafluoroethylene; vinyl plastics; impregnated felts; and impregnated plant fiber compositions.

6. The holding means of claim 1 wherein said sealing means includes an annular elastomeric gasket cemented to said first end of said filter cartridge and resting against said first end of said seat means.

7. The holding means of claim 6 wherein said gasket is formed of an elastomeric material having a hardness rating of from about 50 to about 90 Durometer as measured on the Shore "A" scale.

8. The holding means of claim 7 wherein said elastomeric material is selected from the group consisting of natural rubber; butyl, nitrile, styrene-butadiene, polysulfide, Buna-N, neoprene, silicone and acrylic synthetic rubbers; fluoroelastomers; polyethylene and chlorosulfonated polyethylene; tetrafluoroethylene; vinyl plastics; impregnated felts; and impregnated plant fiber compositions.

9. In a filter tank having internal plate means for dividing said tank into first and second zones, holding means for holding an annular filter cartridge in said first zone, said holding means comprising: a tubular cartridge seat means mounted in said plate means and extending therethrough so that a first end of said seat means terminates in said first zone and a second end of said seat means communicates with said second zone, said first end of said seat means being adapted to support a first end of said filter cartridge; fluid sealing means including a cylindrical sleeve having an outer peripheral groove, and a resilient O-ring in said groove, said sleeve being positioned within said seat means with said O-ring in intimate sealing contact with the inner surface of said seat means, one end of said sleeve extending beyond said first end of said seat means and being embedded in said first end of said filter cartridge; and fastening means for urging said first end of said filter cartridge axially toward said first end of said seat means.

10. The holding means of claim 9 wherein said fastening means extends through said filter cartridge and includes stop means for hooking onto said second end of said seat means and spring biased gripping means for gripping said second end of said filter cartridge.

11. The holding means of claim 10 wherein said sealing means additionally includes a tubular shield adapted to simultaneously embrace at least a portion of said filter cartridge and at least a portion of said seat means in close surrounding confinement.

References Cited

UNITED STATES PATENTS

| 2,440,487 | 4/1948  | Rayburn _____ 210—323   |
| 2,507,125 | 5/1950  | Townsend _____ 210—323 X  |
| 2,919,030 | 12/1959 | Grant et al. _____ 210 |
| 2,921,686 | 1/1960  | Forman et al. _____ 210—323 |
| 3,186,042 | 6/1965  | Daley _____ 277—235 X  |
| 3,279,608 | 10/1966 | Soriente et al. _____ 210—323 X |
| 3,304,104 | 2/1967  | Wiltse.                       |

OTHER REFERENCES

Perry's Chemical Engineers' Handbook, McGraw-Hill Book Co., New York, 1963 (Table 23–11, pp. 23–60).

REUBEN FRIEDMAN, *Primary Examiner.*

C. DITLOW, *Assistant Examiner.*